(12) United States Patent
Sudan

(10) Patent No.: US 9,621,999 B2
(45) Date of Patent: Apr. 11, 2017

(54) STATE OF CHARGE INDICATION IN A HEARING DEVICE

(71) Applicant: Sonova AG, Stafa (CH)

(72) Inventor: Jurg Sudan, Madetswil-Gundisau (CH)

(73) Assignee: SONOVA AG, Stafa (CH)

( * ) Notice: Subject to any disclaimer, the term of this patent is extended or adjusted under 35 U.S.C. 154(b) by 0 days.

(21) Appl. No.: 14/763,906

(22) PCT Filed: Jan. 29, 2013

(86) PCT No.: PCT/EP2013/051606
§ 371 (c)(1),
(2) Date: Jul. 28, 2015

(87) PCT Pub. No.: WO2014/117801
PCT Pub. Date: Aug. 7, 2014

(65) Prior Publication Data
US 2015/0326982 A1      Nov. 12, 2015

(51) Int. Cl.
*H04R 25/00*      (2006.01)
*H02J 7/00*      (2006.01)

(52) U.S. Cl.
CPC ........... *H04R 25/00* (2013.01); *H04R 25/305* (2013.01); *H02J 7/0047* (2013.01); *H04R 2225/31* (2013.01); *H04R 2225/33* (2013.01)

(58) Field of Classification Search
CPC .......................... H04R 25/00; A61N 1/37223
(Continued)

(56) References Cited

U.S. PATENT DOCUMENTS 4,396,806 A * 8/1983 Anderson ................ H03G 3/00
                                                    381/103
6,005,501 A * 12/1999 Wolosewicz ........... H04H 20/31
                                                    341/52
(Continued)

FOREIGN PATENT DOCUMENTS

| EP | 0 777 311 B1 | 6/1997 |
| EP | 1 798 834 B1 | 6/2007 |
| WO | 00/79834 A1 | 12/2000 |

OTHER PUBLICATIONS

International Search Report for PCT/EP2013/051606 dated Jul. 30, 2013.
Written Opinion for PCT/EP2013/051606 dated Jul. 30, 2013.

*Primary Examiner* — Curtis Kuntz
*Assistant Examiner* — Julie X Dang
(74) *Attorney, Agent, or Firm* — Pearne & Gordon LLP

(57) ABSTRACT

A hearing device such as a hearing aid includes a function module, a rechargeable battery, and a battery power management unit. The battery power management unit includes a voltage regulator in operative connection with the rechargeable battery, the voltage regulator being adapted to output a supply voltage to the function module. The battery power management unit also includes a control unit in operative connection with the voltage regulator and with the rechargeable battery, adapted to measure the rechargeable battery output voltage and to control the supply voltage output by the voltage regulator. The control unit is adapted to encode a signal in dependence of the rechargeable battery output voltage onto the supply voltage. In consequence, the function module can extract information on the state of charge of the rechargeable battery so as to be able to inform the hearing device wearer accordingly.

21 Claims, 2 Drawing Sheets

(58) Field of Classification Search
USPC .................................. 381/312–315, 322–323
See application file for complete search history.

(56) References Cited

U.S. PATENT DOCUMENTS

| | | | |
|---|---|---|---|
| 2003/0048095 A1* | 3/2003 | Zink ..................... | H01M 10/46 |
| | | | 320/108 |
| 2007/0030881 A1 | 2/2007 | Nishio | |
| 2008/0089541 A1* | 4/2008 | Preves .............. | H01M 10/0413 |
| | | | 381/323 |
| 2014/0018016 A1* | 1/2014 | Chang ................. | H04M 1/7253 |
| | | | 455/90.1 |
| 2014/0155686 A1* | 6/2014 | Meskens ............ | A61N 1/36032 |
| | | | 600/25 |

\* cited by examiner

STATE OF CHARGE INDICATION IN A HEARING DEVICE

TECHNICAL FIELD OF THE INVENTION

The present invention relates to power supplies for portable hearing devices.

BACKGROUND OF THE INVENTION

Traditionally, hearing devices were powered by primary cells such as zinc-air batteries, directly connected to the circuitry of the hearing device. Since the circuitry of such a hearing device is directly connected to the battery, the state of charge of the battery can be directly measured by the hearing device circuitry by measuring the voltage produced by the battery, and the user can be informed of the state of charge of the battery and be alerted once the voltage, and thus the state of charge, drops below a predefined level, indicating that the battery should be replaced. Replacing the battery frequently is expensive and can be difficult for persons with physical limitations.

More recently, rechargeable batteries have found use in hearing devices. Rechargeable batteries, also known as secondary cells, eliminate the requirement for frequent battery replacement, since they can be recharged, e.g. either by connecting the hearing device to a suitable external power supply, or by wireless transmission of power. This simplifies usage of the hearing device for the user. However, unlike primary cells, secondary cells can generate relatively high voltage levels, e.g. greater than 1.5 V, which can damage or destroy the sensitive circuitry of the hearing device. In consequence, a battery power management system is often used to control charging of the battery and also to ensure constant voltage levels of the power supplied to the circuitry such that this voltage level does not exceed a threshold which may damage this circuitry. However, since the battery power management system ensures a constant voltage to the circuitry of the hearing device, this can no longer measure the state of charge of the battery by directly monitoring its output voltage, since it is no longer directly connected thereto. It is thus possible that the user may be surprised by sudden powering down of the hearing device without warning due to the battery being exhausted.

SUMMARY OF THE INVENTION

The object of the present invention is thus to at least partially overcome one or more of the above-mentioned disadvantages.

Under the term "hearing devices" we understand hearing aids for the hard-of-hearing, communication devices such as earpieces for radios or music listening, active hearing protection for loud noises, and so on. Such hearing devices may be situated at least partially in the wearer's ear canal, and/or may comprise a unit situated behind the wearer's pinna. In the present specification, the term "hearing device" relates to the entire device, comprising battery, power management circuitry, and the term "function module" refers to the conventional hearing device components and circuitry such as signal processing circuitry, a receiver, microphone and/or reception coil, and so on.

The object of the invention is attained by a hearing device according to the independent device claim. This hearing device comprises a function module as defined above. The hearing device further comprises a rechargeable battery and a battery power management unit. The battery power management unit comprises a voltage regulator in operative connection with the rechargeable battery for regulating and supplying a supply voltage to the function module. Furthermore, the battery power management unit comprises a control unit in operative connection with the voltage regulator and the rechargeable battery. The control unit is arranged to measure the output voltage of the rechargeable battery and also to control the supply voltage output by the voltage regulator. The control unit controls the voltage regulator so as to encode a signal dependent on the rechargeable battery output voltage onto the supply voltage. In consequence, the function module is provided with information relating to the voltage of the rechargeable battery, and hence the state of charge of the rechargeable battery, and thus can decode this information and inform the user of the hearing device appropriately, such as by giving a signal when the rechargeable battery requires recharging.

In an embodiment of the hearing device, the voltage regulator is a DC/DC converter or a Low Dropout Regulator, both of which are simple and efficient variants of voltage regulators suitable for use in the hearing device of the invention.

In an embodiment of the hearing device, the control unit is further adapted to charge the rechargeable battery when an external source of power is supplied to the hearing device, e.g. wirelessly via an induction coil or via a cable. The control unit thus can, in one unit, control all power management within the power management unit.

In an embodiment of the hearing device, the control unit is arranged to encode the signal relating to the battery voltage digitally onto the supply voltage. This digital encoding may be e.g. a pulse width modulated signal or a binary signal eg. with ASCII encoding. This permits supplying a substantially constant voltage to the function module, with the signal being encoded in a relatively small-amplitude digital signal superimposed thereupon. The amplitude of the digital signal may be less than 100 mV, particular less than 50 mV, further particularly substantially 10 mV.

In an alternative embodiment of the hearing device, the control unit is adapted to encode the signal relating to the battery voltage in an analogue manner on to the supply voltage. This provides a particularly simple solution, since this can be achieved with simple analogue circuitry. The signal superimposed on the supply voltage can be proportional to the rechargeable battery output voltage. In a specific embodiment, the supply voltage is determined by the equation $$V\_HI = V\_HI_{max} - ((V\_BATT_{max} - V\_BATT)/a),$$

wherein V_HI is the supply voltage, $V\_HI_{max}$ is the maximum desired supply voltage, V_BATT is the rechargeable battery output voltage, $V\_BATT_{max}$ is the maximum rechargeable battery output voltage, and a is a predetermined division factor, e.g. 10, this equation holding for rechargeable battery output voltage (V_BATT) greater than the minimum voltage required to ensure functioning of the function module. Once this minimum voltage has been reached, the supply voltage drops substantially to zero.

In an embodiment of the hearing device, the function module is adapted to determine the state of charge of the rechargeable battery at least partly based on measurement of the supply voltage and decoding of the signal encoded therein. By "measurement" we understand not only direct analogue measurement of the entire signal itself, but also measurement of the signal superimposed thereupon. In its simplest form for the digital case, this measurement may be merely extracting the digital signal and determining whether the signal is "high" or "low" at any given timepoint, e.g. by using a comparator. The function module can thus decode the information on the state of charge of the rechargeable battery and can then, if desired, provide information relating thereto to the user of the hearing device.

An object the invention is likewise attained by a method of supplying power to a function module of a hearing device according to the independent method claim. This method comprises supplying power from a rechargeable battery at a rechargeable battery output voltage, and measuring this rechargeable battery output voltage. The rechargeable battery output voltage is regulated to generate a supply voltage, and a signal dependent on the measured rechargeable battery output voltage is encoded on to the supply voltage, e.g. by varying the supply voltage or by modulating a digital or analogue signal on to the supply voltage.

In an embodiment of the method, the signal is encoded as a digital signal, which may be a binary signal encoded in a protocol such as ASCII or a pulse width modulated signal. This digital signal may have an amplitude of less than 100 mV, particular less than 50 mV, further particularly substantially 10 mV.

In an alternative embodiment of the method, the signal is encoded as an analogue signal, which may be proportional to the rechargeable battery output voltage. In a specific embodiment, the supply voltage is determined by the equation $$V\_HI = V\_HI_{max} - ((V\_BATT_{max} - V\_BATT)/a),$$

wherein V_HI is the supply voltage, $V\_HI_{max}$ is the maximum desired supply voltage, V_BATT is the rechargeable battery output voltage, $V\_BATT_{max}$ is the maximum rechargeable battery output voltage, and a is a predetermined division factor, e.g. 10, this equation holding for rechargeable battery output voltage (V_BATT) greater than the minimum voltage required to ensure functioning of the function module. Once this minimum voltage has been reached, the supply voltage drops substantially to zero.

An object the invention is likewise attained by a method of operating a hearing device corresponding to one of the above-mentioned hearing device embodiments, wherein power is supplied to the function module of the hearing device by one of the above-mentioned method embodiments, the signal relating to the state of charge of the rechargeable battery is decoded by the function module, and the state of charge of the rechargeable battery is determined by the function module based on the decoded signal. In an additional step, the user of the hearing device is informed of the determined state of charge of the rechargeable battery.

BRIEF DESCRIPTION OF THE FIGURES

The invention will be described in the following by means of nonlimiting examples illustrated in the figures, which show.

DETAILED DESCRIPTION OF THE FIGURES

Figure 1:
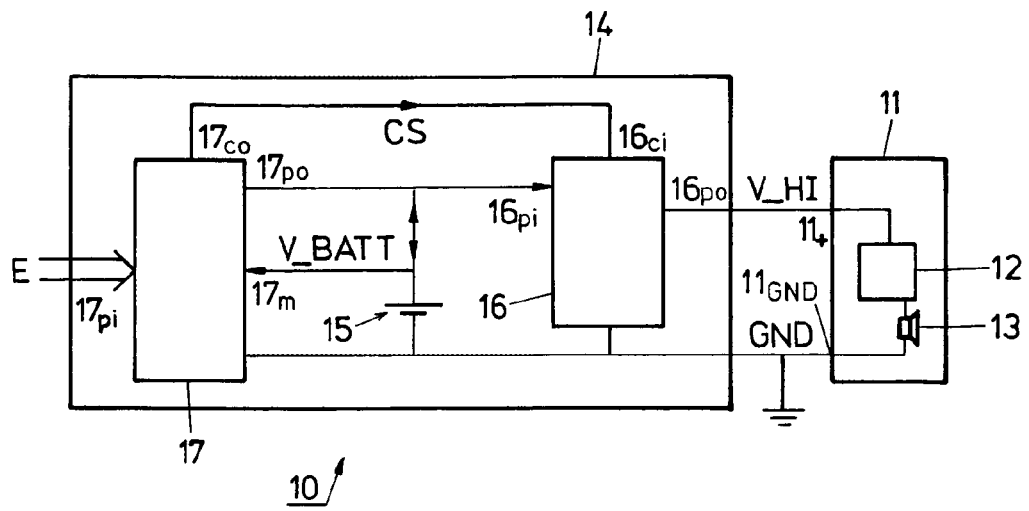
FIG. 1: a schematic block diagram of a hearing device according to the invention.

FIG. 1 illustrates a hearing device 10 according to the invention in its broadest terms. Hearing device 10 comprises a function module 11 which, as is conventional, comprises function module circuitry 12 and a receiver (loudspeaker) 13. The function module 11 is conventional, and need not be described further. Electrical power is supplied to the function module 11 via its electrical connections $11_+$ and $11_{GND}$. The supply voltage V_HI supplied at power connection $11_+$ is provided by battery power management system 14, and according to current practice is typically approximately 1.2 V, however other voltages are conceivable. Supply voltage V_HI is typically less than or equal to battery voltage V_BATT. Battery power management system 14 comprises a battery 15 comprising at least one secondary cell such as a lithium-based secondary cell, generating a battery voltage V_BATT. Voltage regulator 16 regulates the battery voltage V_BATT produced by battery 15 so as to output regulated supply voltage V_HI at output $16_{po}$. Voltage regulator 16 may be a DC/DC converter, a Low Dropout Regulator (LDO), or any other convenient type of voltage regulator. The level of regulated supply voltage V_HI is determined according to command signals received at voltage regulator command input $16_{ci}$. Furthermore, battery power management system 14 comprises a control unit 17, which is described further below.

Control unit 17 is arranged to receive energy E from an external source at its power input $17_{pi}$ as is conventional, either via a wire connection or wirelessly via inductive power transmission, and to direct this received energy via its power output $17_{po}$, so as to charge battery 15 and also to provide power directly to voltage regulator 16. Control unit 17 is arranged to measure the voltage V_BATT produced by battery 15 at measurement input $17_m$. Although measurement input $17_m$ has been illustrated as a separate input, this is merely schematic, and the battery voltage V_BATT produced by the battery 15 maybe measured at the power output $17_{po}$, of the control unit 17.

Control unit 17, as mentioned above, measures the battery voltage V_BATT produced by battery 15, and then outputs control signals CS via its control output $17_{co}$ which are received by voltage regulator control input $16_{ci}$. The control signals CS are generated at least partially dependent on the battery voltage V_BATT produced by battery 15, hence are dependent on the state of charge of battery 15. As such, the supply voltage V_HI supplied to the function module 11 is varied and/or modulated dependent on the state of charge of battery 15 based on the control signals received at voltage regulator control input $16_{ci}$: in other words, the state of charge of battery 15 is encoded into the supply voltage V_HI supplied to the function module. Function module circuitry 12 measures the supply voltage V_HI supplied to the function module 11, and by decoding the signal encoded onto supply voltage V_HI, determines the state of charge of battery 15, and can then inform the user accordingly about the state of charge of battery 15 as is conventional, e.g. by audio signals, illuminating LEDs or indicating on LCD elements, either on the hearing device itself, or on a remote control for the hearing device or on a smartphone.

The skilled person may arrange the modulation of the supply voltage V_HI supplied to the function module 11 in any convenient known manner. Several concrete embodiments of this modulation are elaborated below.

Figure 2:
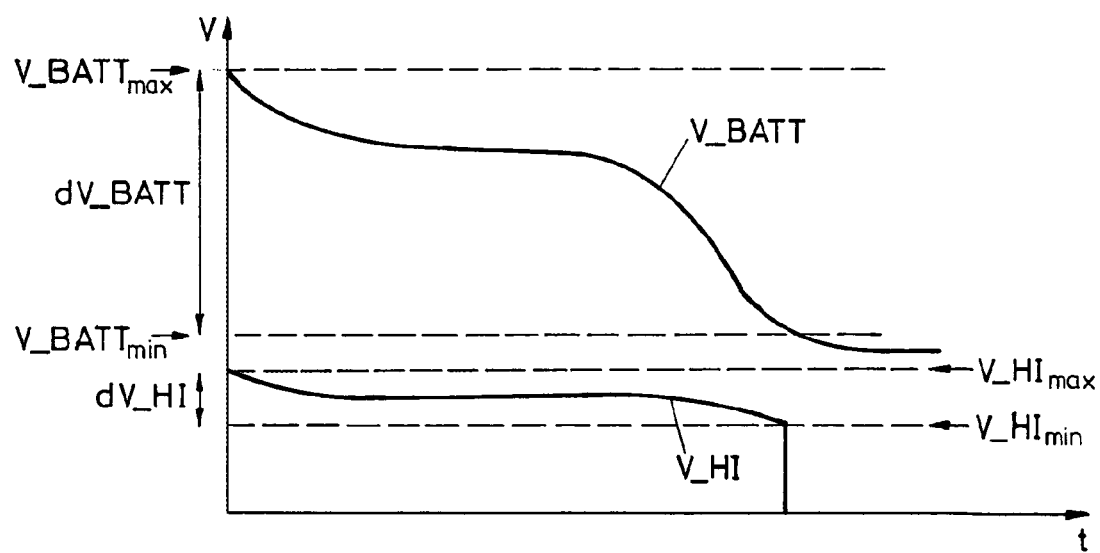
FIG. 2: a schematic graph illustrating an analogue encoding of the battery voltage onto the supply voltage.

FIG. 2 illustrates schematically as a graph a first embodiment of modulation of the supply voltage V_HI supplied to the function module 11 so as to encode the state of charge of battery 15 therein in an analogue manner. In this embodiment, the supply voltage V_HI is varied by the control unit 17 controlling the voltage regulator 16 in an analogue fashion such that, as time passes and battery voltage V_BATT drops from its maximum value $V\_BATT_{max}$, supply voltage V_HI drops from its maximum value V_HI$_{max}$ proportionally to the battery voltage V_BATT, while remaining within a voltage range suitable for operation of the function module. The signal representing the state of charge of the rechargeable battery 15 is thus represented by the variation of voltage V_HI. The change dV_BATT in battery voltage V_BATT before the function module becomes inoperable at a battery voltage of V_BATT$_{min}$, at which point V_HI drops from V_HI$_{min}$ substantially to ground, is today approximately 1200 mV, and as an example the change dV_HI supply voltage V_HI may be arranged to change by for instance dV_BATT/10, i.e. by approximately 120 mV over the same range of battery voltage V_BATT. Other ratios are of course naturally conceivable, and the proportionality between V_BATT and V_HI does not have to be linear, but may be a step function, or a different non-linear relationship. Function module circuitry 12 can thus, by measuring supply voltage V_HI, determine the state of charge of battery 15 and can thus provide this information to the wearer. In this case, a DC/DC converter would be an appropriate choice for voltage regulator 16. It should be noted that, although V_HI$_{max}$ has been illustrated as being lower than V_BATT$_{min}$, this does not have to be the case: V_HI$_{max}$ may be higher than V_BATT$_{min}$.

Mathematically, a specific embodiment of this analog encoding can be expressed for when V_BATT>V_BATT$_{min}$ as the following equation:

$$V\_HI = V\_HI_{max} - ((V\_BATT_{max} - V\_BATT)/a),$$

where a is a division factor, such as 10, but may be any value as convenient. Other analogue coding schemes are also possible.

Figure 3:
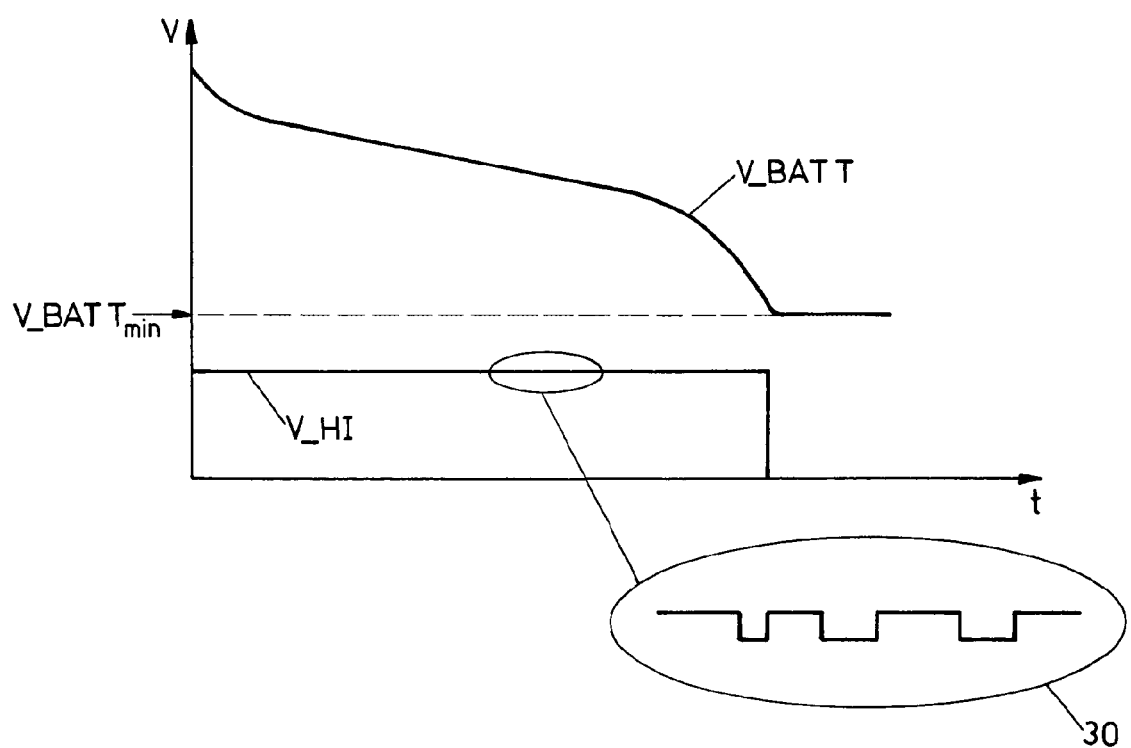
FIG. 3: a schematic graph illustrating a digital encoding of the battery voltage of the supply voltage.

FIG. 3 illustrates schematically as a graph a second embodiment of modulation of V_HI so as to encode the state of charge of battery 15 therein.

In macroscopic terms, in this embodiment supply voltage V_HI is maintained substantially constant until battery voltage V_BATT reaches the level V_BATT$_{min}$ at which battery voltage V_BATT is insufficient to maintain the operation of the function module 11, and supply voltage V_HI drops substantially to ground potential. However, viewed at a larger scale as illustrated in bubble 30, supply voltage V_HI is modulated with a relatively small-amplitude digital signal superimposed on the DC component of supply voltage V_HI. The amplitude of this digital signal is insufficient to affect the operation of the function module, but can be demodulated and decoded by the function module circuitry 12 so as to extract the signal encoded therein by the control unit 17, and thereby to determine the state of charge of battery 15. For example, the amplitude of the digital signal may be 100 mV, 50 mV or 10 mV, or any intermediate or lower value as appropriate. For this embodiment, both a conventional DC/DC converter and a LDO controller are appropriate.

The control unit 17 may encode the state of charge of battery 15 into the digital signal in any convenient manner, such as simple binary data, e.g. merely reflecting the battery voltage V_BATT, may be encoded in ASCII or a similar protocol, or may be encoded as a pulse-width modulated signal. The state of charge of battery 15 may be encoded e.g. as the voltage level e.g. expressed in millivolts, or the level may be divided into blocks and encoded as signals reflecting e.g. "Full charge", "¾ full", "½ full", "¼ full", or other suitable divisions. Implementation of such coding strategies, and corresponding decoding, are known to the skilled person and need not be described further.

By extracting and decoding the digital signal superimposed on V_HI, the function module circuitry 12 can thus determine the state of charge of rechargeable battery 15.

Other embodiments of encoding the stated charge of battery 15 into the supply voltage V_HI include, but are not limited to, amplitude modulation and frequency modulation of sine waves, square waves, triangular waves, sawtooth waves etc.

Although the invention has been described in terms of specific embodiments, these are not to be construed as limiting to the scope of the invention as defined by the appended claims.

What is claimed is:

1. Hearing device (10) comprising a function module (11), a rechargeable battery (15), and a battery power management unit (14), the battery power management unit (14) comprising:
    a voltage regulator (16) in operative connection with the rechargeable battery (15), wherein the voltage regulator (16) outputs a supply voltage (V_HI) to the function module (11);
    a control unit (17) in operative connection with the voltage regulator (16) and with the rechargeable battery (15), wherein the control unit (17) measures the rechargeable battery output voltage (V_BATT) and controls the supply voltage (V_HI) output by the voltage regulator (16);
    wherein the control unit (17) controls the voltage regulator (16) to encode a signal in dependence of the rechargeable battery output voltage (V_BATT) onto the supply voltage (V_HI), and wherein the function module (11) decodes said signal from the supply voltage (V_HI) to determine a state of charge of the rechargeable battery (15) based on said decoded signal.

2. Hearing device (10) according to claim 1, wherein the voltage regulator (16) is a DC/DC converter or a Low Dropout Regulator.

3. Hearing device (10) according to claim 1, wherein the control unit (17) charges the rechargeable battery (15) on application of a source of power (E) external to the hearing device (10).

4. Hearing device (10) according to claim 1, wherein the control unit (17) encodes said signal digitally onto the supply voltage (V_HI).

5. Hearing device (10) according to the claim 4, wherein said signal is encoded as at least one of:
    a pulse width modulated signal;
    a binary encoded signal such as an ASCII signal.

6. Hearing device (10) according to claim 4, wherein amplitude of the digital signal is less than 100 mV, particularly less than 50 mV, further particularly substantially 10 mV.

7. Hearing device (10) according to claim 1, wherein the control unit (17) encodes said signal in an analogue manner onto the supply voltage.

8. Hearing device (10) according to claim 7, wherein said signal is proportional to the rechargeable battery output voltage (V_BATT).

9. Hearing device (10) according to claim 8, wherein the supply voltage (V_HI) is determined by the equation $$V\_HI = V\_HI_{max} - ((V\_BATT_{max} - V\_BATT)/a),$$

wherein V_HI is the supply voltage, V_HI$_{max}$ is the maximum desired supply voltage, V_BATT is the rechargeable battery output voltage, V_BATT$_{max}$ is the maximum rechargeable battery output voltage, and a is a predetermined division factor, this equation holding for rechargeable battery output voltage (V_BATT) greater than the minimum voltage required to ensure functioning of the function module (11).

10. Hearing device (10) according to claim 1, wherein the function module (11) determines the state of charge of the rechargeable battery (15) at least partially based on measurement of the supply voltage (V_HI) and decoding of the signal encoded therein.

11. Method of supplying power to a function module (11) of a hearing device (10) comprising the steps of:
   supplying power from a rechargeable battery (15) at a rechargeable battery output voltage (V_BATT);
   measuring the rechargeable battery output voltage (V_BATT);
   generating a supply voltage (V_HI) by regulating the rechargeable battery output voltage (V_BATT);
   encoding a signal in dependence of the measured rechargeable battery supply voltage (V_BATT) onto the supply voltage (V_HI);
   supplying the supply voltage (V_HI) with said signal to the function module (11);
   decoding said signal from the supply voltage (V_HI) at the functional module (11); and
   determining a state of charge of the rechargeable battery (15) based on said decoded signal.

12. Method according to claim 11, wherein said signal is encoded as a digital signal.

13. Method according to claim 12, wherein the digital signal is a pulse width modulated signal or a binary encoded signal such as an ASCII signal.

14. Method according to claim 13, wherein the digital signal has an amplitude of less than 100 mV, particularly less than 50 mV, further particularly substantially 10 mV.

15. Method according to claim 11, wherein said signal is encoded as an analogue signal.

16. Method according to claim 15, wherein said signal is proportional to the rechargeable battery output voltage.

17. Method according to claim 16, wherein the supply voltage (V_HI) is determined by the equation $$V\_HI = V\_HI_{max} - ((V\_BATT_{max} - V\_BATT)/a),$$

wherein V_HI is the supply voltage, $V\_HI_{max}$ is the maximum desired supply voltage, V_BATT is the rechargeable battery output voltage, $V\_BATT_{max}$ is the maximum rechargeable battery output voltage, and a is a predetermined division factor, this equation holding for rechargeable battery output voltage greater than the minimum voltage required to ensure functioning of the function module (11).

18. Method of operating a hearing device (10), said hearing device (10) being a hearing device (10) according to claim 1, comprising the steps of:
   supplying power to the function module (11) by;
      supplying power from the rechargeable battery (15) at the rechargeable battery output voltage (V_BATT);
      measuring the rechargeable battery output voltage (V_BATT);
      generating the supply voltage (V_HI) by regulating the rechargeable battery output voltage (V_BATT);
      encoding a signal in dependence of the measured rechargeable battery supply voltage (V_BATT) onto the supply voltage (V_HI)
   decoding said signal from the supply voltage (V_HI);
   determining a state of charge of the rechargeable battery (15) based on said decoded signal.

19. Method according to claim 18, further comprising the step of informing the user of the hearing device (10) of the determined state of charge of the rechargeable battery (15).

20. Hearing device (10) according to claim 9, wherein the predetermined division factor a is 10.

21. Hearing device (10) according to claim 1, wherein the control unit (17) controls the voltage regulator to superimpose the signal onto the supply voltage (V_HI) in dependence of the rechargeable battery output voltage (V_BATT).

* * * * *